United States Patent
Galvin

(10) Patent No.: US 7,386,113 B2
(45) Date of Patent: *Jun. 10, 2008

(54) SYSTEM AND METHOD FOR INTEGRATED RESOURCE SCHEDULING AND AGENT WORK MANAGEMENT

(75) Inventor: Brian R. Galvin, Albuquerque, NM (US)

(73) Assignee: Genesys Telecommunications Laboratories, Inc., Daly City, CA (US)

(*) Notice: Subject to any disclaimer, the term of this patent is extended or adjusted under 35 U.S.C. 154(b) by 601 days.

This patent is subject to a terminal disclaimer.

(21) Appl. No.: 10/373,391

(22) Filed: Feb. 24, 2003

(65) Prior Publication Data
US 2003/0163360 A1 Aug. 28, 2003

Related U.S. Application Data

(60) Provisional application No. 60/359,361, filed on Feb. 25, 2002.

(51) Int. Cl.
*H04M 3/523* (2006.01)
*G05B 19/418* (2006.01)

(52) U.S. Cl. .......................... 379/265.03; 379/265.04; 379/265.05; 379/265.06; 379/265.07; 705/9

(58) Field of Classification Search ............ 379/265.01, 379/265.02, 265.03, 265.04, 265.05, 265.06, 379/265.07, 265.08, 266.07; 705/8, 9; 700/99–102
See application file for complete search history.

(56) References Cited

U.S. PATENT DOCUMENTS

| 5,185,780 | A * | 2/1993 | Leggett ................. 379/265.08 |
| 5,592,543 | A * | 1/1997 | Smith et al. ............ 379/266.07 |
| 5,963,635 | A * | 10/1999 | Szlam et al. ................ 379/309 |
| 6,170,011 | B1 * | 1/2001 | Macleod Beck et al. .... 709/224 |
| 6,574,605 | B1 * | 6/2003 | Sanders et al. ................. 705/8 |
| 6,766,012 | B1 * | 7/2004 | Crossley ................ 379/265.02 |
| 6,978,247 | B1 * | 12/2005 | Bogart et al. ................... 705/8 |

* cited by examiner

*Primary Examiner*—Harry S. Hong
(74) *Attorney, Agent, or Firm*—Donald R. Boys; Central Coast Patent Agency, Inc.

(57) ABSTRACT

According to the invention, a system and method for integrating agent scripting and workforce management functions in contact centers, enabling them to work together without opposing the influence of one against that of the other, is disclosed. In an embodiment of the invention, a feedback mechanism is provided between the agent scripting engine and either the forecasting engine or the adherence module of the workforce management system, or both. This feedback mechanism is used to pass useful information dynamically between the said workforce management system and the said agent scripting engine, said information exchange being unidirectional in either direction, or bidirectional. In another embodiment of the invention, a method in which information is passed from an agent scripting engine to a forecasting engine or an adherence module of a workforce management system, or both, is disclosed.

3 Claims, 4 Drawing Sheets

SYSTEM AND METHOD FOR INTEGRATED RESOURCE SCHEDULING AND AGENT WORK MANAGEMENT

This application is a non-provisional of U.S. Provisional Patent Application No. 60/359,361, filed Feb. 25, 2002, and claims benefit thereto.

BACKGROUND OF THE INVENTION

The present invention relates to computer systems and to computer-implemented methods of optimally scheduling contact center resources and of managing the work of those resources. In particular, the present invention relates to methods of integrating workforce management and agent scripting activities in contact centers.

The task of generating optimized schedules for contact center agents and other related resources has been known for years to be a complex one, and has spawned an entire industry of companies which provide products, of varying sophistication, which attempt to provide optimal resource scheduling for contact centers. Known as workforce management systems, the products known in the art generally perform a common series of sequential tasks in order to accomplish the scheduling function. Referring to FIG. 1, the first step of workforce management is to gather historical data on call volumes 100 for the contact centers in question; this data is generally broken out by call activities or skills, such as sales, service, complaints, etc. Data 101 is also obtained, similarly segregated by activity or skill, for the average handling time of calls, which is the total time a call takes within the contact center from start to completion (which is usually defined as the time when the agent who handled the call last completes any call-related work after the caller is released). Note that "call" as used in discussing the present invention can be a traditional phone call carried by the public switched telephone network (PSTN), a voice-over-IP (VOIP) call, an e-mail, or any other customer interaction arriving at or commencing in a contact center.

Second, the data on call volumes and handle times is run through a forecasting engine 102 to generate a forecast 103 of anticipated call volumes and handle times for the period to be scheduled. The technique used to create the forecast can be one of a multitude of techniques known in the art, including but not limited to neural network forecasting, statistical forecasting, template-based forecasting, genetic algorithms and neural networks where the weighting functions are determined by genetic algorithms. The forecast is then modified by the inclusion of the anticipated effects on call volume and handling times resulting from upcoming events such as catalog mailings, television advertisements, and so forth. The modified forecast is then used to generate a forecast of agent resource demand 104, based on the forecast and the desired agent occupancy rates 105 (that is, if you need 9 agents on calls and agents are intended to be busy 90% of the time they are on duty, then you will need 10 agents available to handle the expected traffic). Note that "agent resource" usually refers to human agents but can also refer to interactive voice response (IVR) ports against which scripts have been loaded to handle customer interactions automatically. Usually but not necessarily, this agent resource demand forecast is generated in 15 minute increments for the entire schedule period.

Next, a scheduling engine 106, which takes into account a plurality of business rules 107 concerning break policies, shift schedules, maximum and minimum workweeks, meal scheduling, and other related scheduling influences, creates an optimized overall schedule 108 which includes specific work times for each agent. Often agent preferences and vacation requests are included in this scheduling step. These scheduling engines 106, like the forecasting engines 102, use a plurality of well-known optimization techniques to generate a schedule which ensures that the expected traffic is handled within established service level limits while meeting as many of the business rules and agent preference constraints as possible. Finally, during the period the schedule is in effect, an adherence monitor 109 measures conformance to the schedule in real time, usually by integration of the workforce management system with one of the many interaction management engines 110 known in the art (including for example automated call distribution systems, computer-telephony integration systems, e-mail management systems). Usually a graphic display of the current performance of the contact center relative to the forecast is provided, showing where deviations from the forecast and the schedule are occurring, and showing what their effect is on service levels.

In parallel with the emergence in the art of computer-implemented workforce management systems working as described above, and referring to FIG. 2, there are many methods in the art for controlling the sequence of tasks performed by contact center agents when handling customer calls. Collectively these systems are often referred to as agent scripting systems, although often the agent scripting function is embedded in larger systems, most commonly customer relationship management systems, of which agent scripting is one component of many. These systems comprise a scripting engine 201 which controls the sequence of activities on a plurality of agent desktops 202. The scripting engine 201 generally receives notification of events relating to calls managed by a media server 200 from the interaction management system 110. These events include, but are not limited to, the Ringing event (announcing call arrival at a particular agent location), the Established event (announcing successful completion of a connection between called parties, the Released event (announcing the termination of a call), and various events concerned with call transfers, conferences, and data updates. The scripting engine 201 executes scripts which take into account the nature of the event received and the data that goes with it concerning the interaction, as well as data concerning current agent activities, customer information obtained from a customer information database 203 (such as loyalty level, profitability, identity of agent who last handled, and so forth), and optionally information and direction received from one or more supervisor stations 204. A typical example of the sequence of events managed by the scripting engine 201 starts with the Ringing event, which is, in most systems known in the art, accompanied by call data and user-defined data such as account number. The scripting engine 201 uses the data received with the Ringing event to retrieve customer data from the customer information database 203. The scripting engine 201 then directs the agent desktop 202 to display a "screen pop" showing the agent who is calling and why, and either automatically sends a request to the interaction management engine 110 to answer the call, or displays an answer button on the agent desktop 202 and waits for the agent to push this button before sending the request. The answer request is transmitted by the interaction management system 110 to the media server 200 which in turn completes the communications channel between the caller and the agent's communications device (telephone, e-mail software, or the like). The scripting engine 201 thereafter supplies the agent desktop 202 with a series of prompts advising the agent what to say, and receives from the agent desktop 202 the results of these actions (such as customer responses to questions). The scripting engine 201 is capable of performing branching logic based on the results of the actions on the agent desktop 202 and, thereby, is able to fully manage a large range of customer interactions, thus allowing the agent to deliver a higher quality of service with a given level of training. The scripting engine 201 can be one of many types well known in the art, including among others compiled computer programs, web-based business rules script servers using ECMAScript, XML, or any of a plurality of scripting languages, or a system in which business rules are stored as records in a database and retrieved and executed as needed.

The problem which the present invention addresses is that these two important technologies in the contact center industry in fact work against one another. Workforce management products that follow the sequence of steps outlined above (which means all workforce management products in the art) rely on two key implicit assumptions. First, workforce management products assume that the future will behave much like the past—this is a central assumption of the forecasting step. It means that call volumes and call handle times are external variables that do not depend on any other systems in the contact center—they are what they are, and they can be forecast based on historical data. Second, workforce management products implicitly assume call volumes and handling times are independent variables relative to each other. Frustrating these assumptions is the fact that modem, sophisticated agent scripting systems all operate independently of the workforce management systems. Scripting engines 201 walk the agent through potentially complex scripts which have numerous branching points and which, accordingly, introduce a significant amount of volatility into the key parameter of average handle time (AHT). It is not uncommon to have AHT vary by several hundred percent from call to call, even among seemingly simple calls of the same type. And when scripts are changed, even subtly, the changes can often introduce very large changes in the statistical behavior of AHT. Workforce management forecasting engines 102 use historical statistical samples of AHT as a core element of the forecasting engine's 102 algorithm, so if large variations in the behavior occur, the forecasts 103 will inevitably be inaccurate. Also, if agents are prompted to conference in other agents, or to transfer calls to other agents, as part of the scripting engine's 201 logic, then the call volume element of the forecasts 103 used in creating the schedule 108 will be inaccurate. Each of these agent scripting actions acts to invalidate the core assumptions of the workforce management forecasting engine 102, and in fact, the problem invariably gets worse as more sophisticated (i.e., more useful) scripting techniques are adopted. Existing workforce management systems were designed with basic ACD (automatic call distribution) queuing and simple agent scripts in mind, and do not work well with modern scripting engines 201.

BRIEF DESCRIPTION OF THE DRAWINGS

The present invention is described in conjunction with the appended figures.

DETAILED DESCRIPTION OF THE PREFERRED EMBODIMENT

The ensuing description provides preferred exemplary embodiments only, and is not intended to limit the scope, applicability or configuration of the invention. Rather, the ensuing description of the preferred exemplary embodiments will provide those skilled in the art with an enabling description for implementing a preferred exemplary embodiment of the invention. It should be understood that various changes may be made in the function and arrangement of elements without departing from the spirit and scope of the invention as set forth in the appended claims.

Embodiments of the present invention disclose a system and method for integrating the agent scripting and workforce management functions described above, in order to enable them to work together without opposing the influence of one against that of the other.

Figure 1:
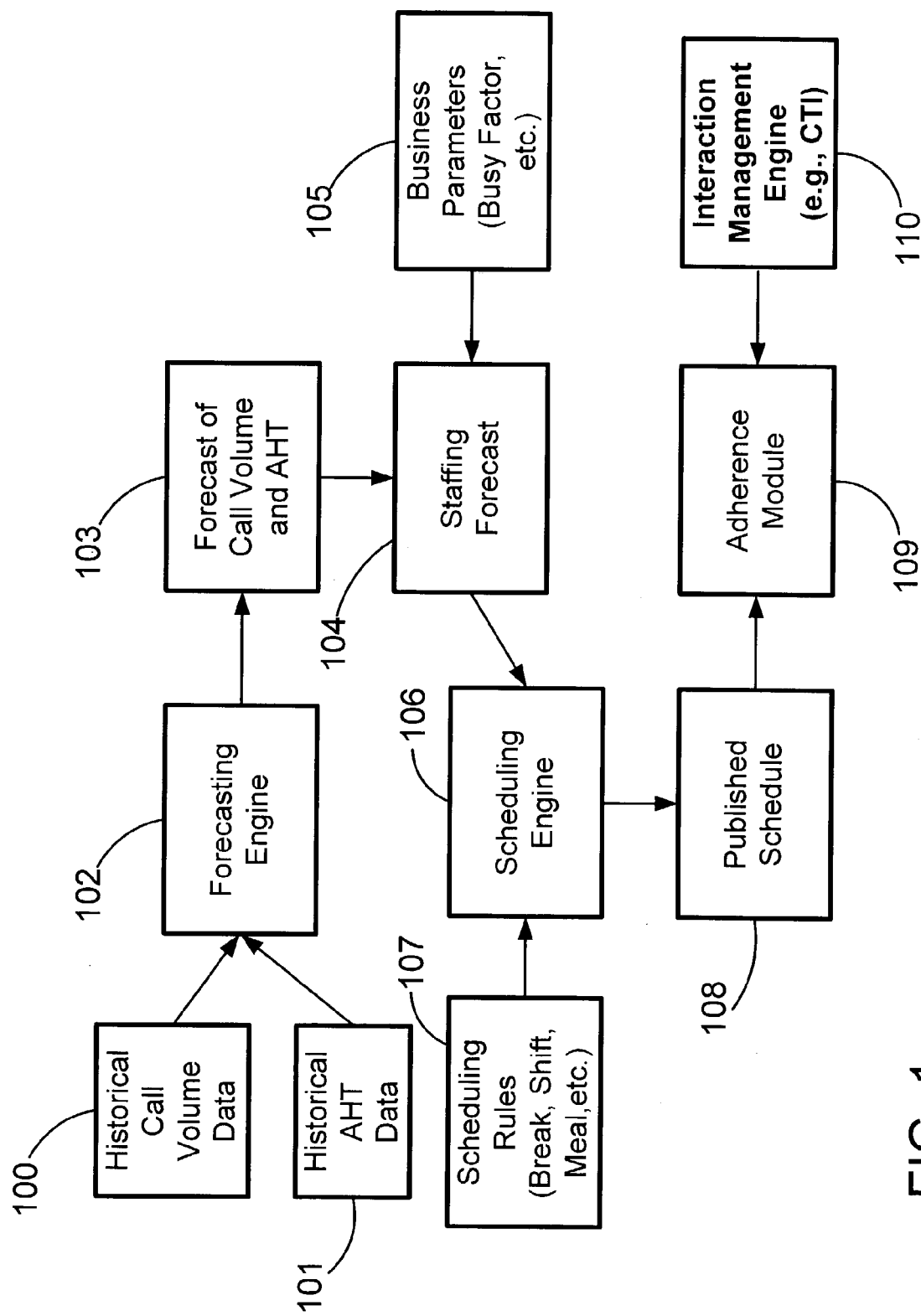
FIG. 1 is a diagram of a typical prior art workflow management system.
Figure 2:
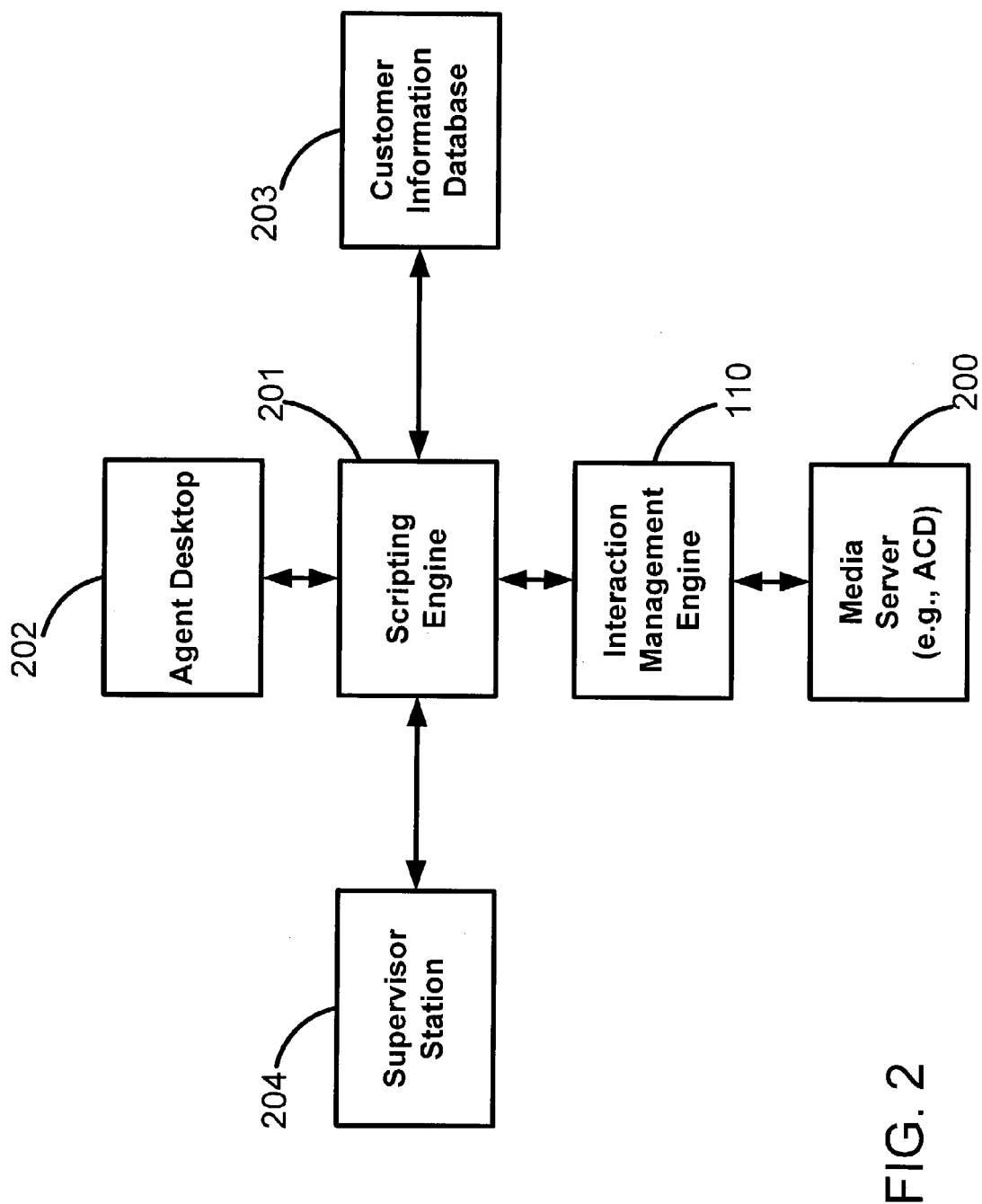
FIG. 2 is a diagram of a typical prior art agent scripting system.
Figure 3:
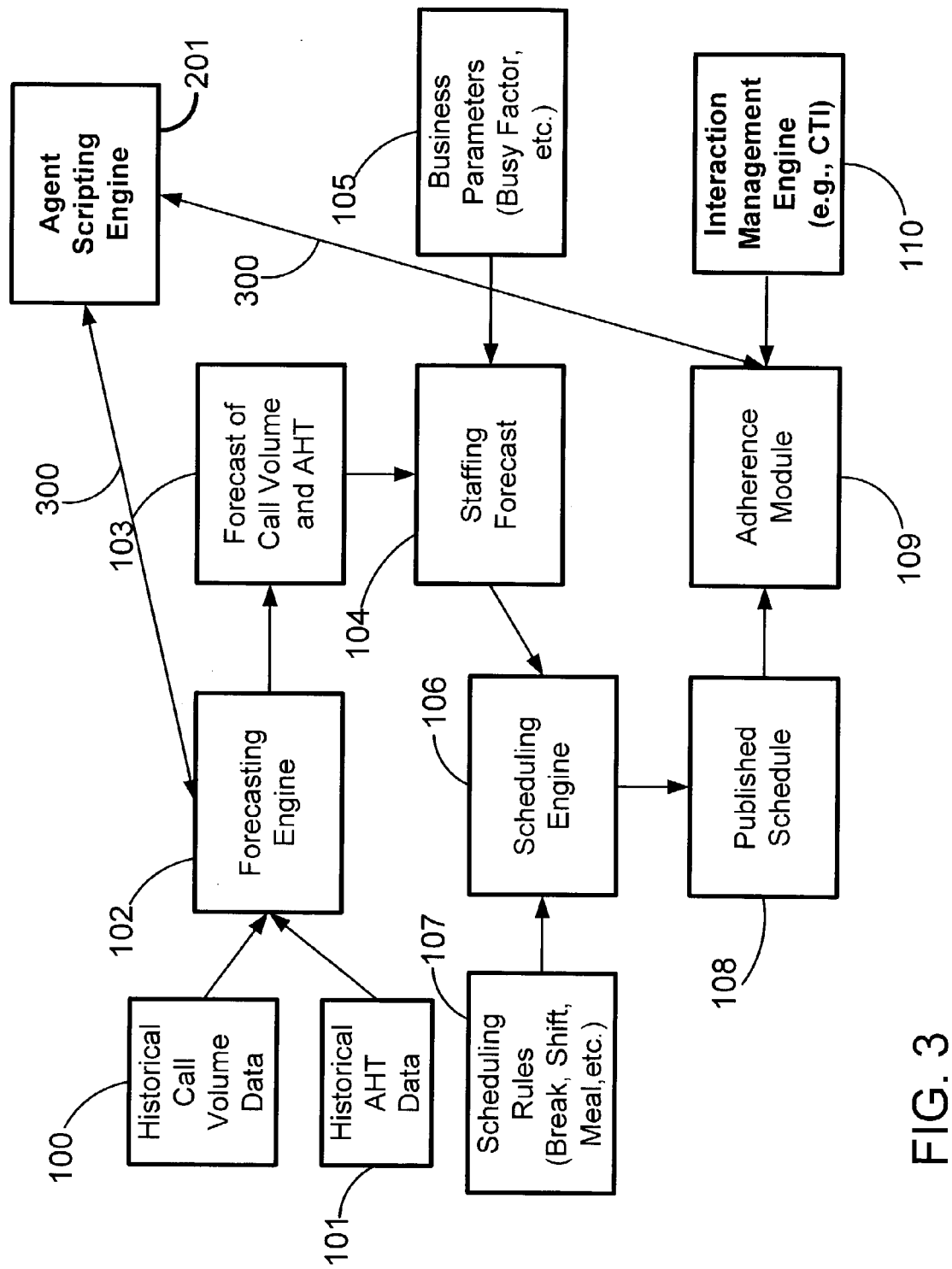
FIG. 3 is a diagram of a workflow management system showing an embodiment of the present invention.

In one preferred embodiment of the present invention, and referring to FIG. 3, a workforce management (WFM) system of the type described above and well-known in the art is modified by the addition of feedback means 300 from the agent scripting engine 201 to the forecasting engine 102 or the adherence module 109, or both. The information passed via this mechanism can be any information available to the agent scripting engine 201, and can be passed in any of a number of ways well established in the art. In an embodiment of the invention, the information is passed from the agent scripting engine 201 to the forecasting engine 102 or the adherence module 109 or both via data that is "attached" to the call, or added to the data about the call that is maintained by the predefined interaction management engine 110. This is a common method in the art of passing contextual data concerning an ongoing interaction from one part of an interaction management system to another, in this case from agent scripting to WFM. In another embodiment, data is passed directly from the agent scripting engine 201 to the forecasting engine 102 or the adherence module 109 or both in the form of an XML data tree, another method well established in the art. In yet another embodiment, information can be passed from the agent scripting engine 201 to the forecasting engine 102 or the adherence module 109 or both by insertion into a database table which is periodically read by the recipient components.

In a preferred embodiment of the present invention, this information is a notification from the agent scripting engine 201 to the adherence module 109 that the behavior of the agents is about to change. This could be because of a script change, or because an operating script changes a key parameter in response to operating conditions. For example, if the agent scripting engine 201 notes that a certain type of transactions is taking longer than expected, and when it is informed by the interaction management system 110 that the service level drops below some threshold, then the scripting engine 201 will eliminate certain prompts that it had been delivering to the agent desktop 202 previously. Since this change will change the dynamics of the plurality of agent desktops 202 and accordingly the statistical variations in AHT, it is desirable for the scripting engine 201 to notify the adherence engine 109 and the forecasting engine 102 so that intraday forecasts can be adjusted and adherence measured against the revised forecast.

In another embodiment of the present invention, real-time data on the state changes undergone by the various agent desktops 202 during the course of operations of the contact center is sent via the feedback mechanism 300 from the agent scripting engine 201 to the forecasting engine 102 to accelerate the creation of accurate forecasts when new scripts are introduced. When new scripts are introduced, the forecasting engine 102 is unable to create an accurate forecast 103 because there is no data available yet that reflects the new dynamics of the contact center. In some cases, as when sophisticated scripting is being introduced to an ongoing operation, the only data available will be bulk data, typically broken out by DNIS (e.g., Sales can be distinguished from Service, but not much more). In other cases, more refined segmentation may be available, but it may be different than the new scheme and therefore useless to the forecasting engine 102. With updates received from the agent scripting engine 201 after the introduction of the new script, the forecasting engine 102 will be able to determine the new AHT statistics for each category of call for which it does have historical data. When enough data points have been gathered from the scripting engine 201 so that the cumulative percentages vary only slightly over time, the forecasting engine 102 can then apply them retroactively to the data it has already collected, thus arriving at an accurate forecast 103 relevant to the new script quickly.

Figure 4:
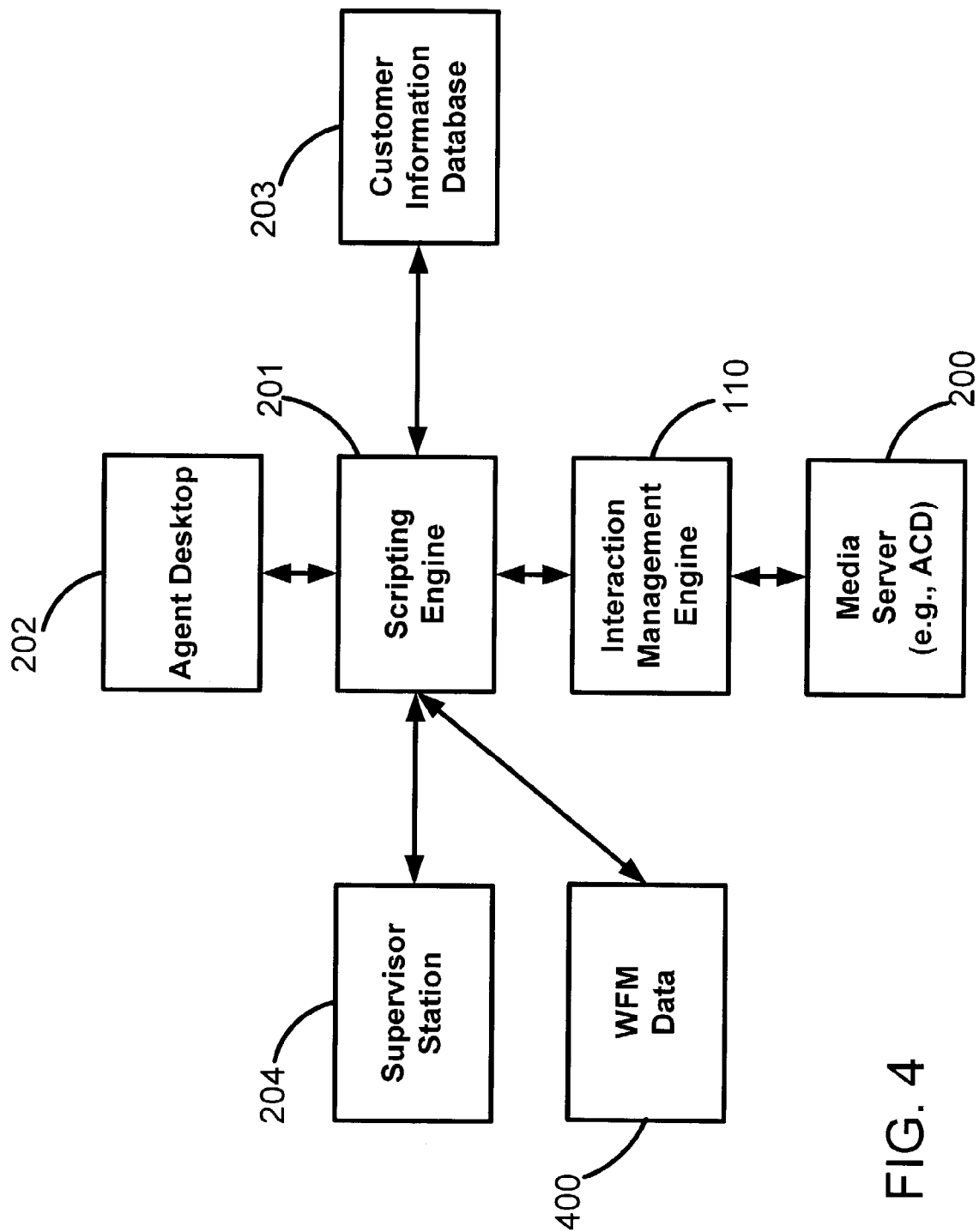
FIG. 4 is a diagram of an agent scripting system showing an embodiment of the present invention.

In another embodiment of the present invention, and referring to FIG. 4, the agent scripting system described previously is modified by the availability of WFM Data 400, which can be generated either by the Adherence Module 109 or other components of the WFM system. The information that can be passed via this mechanism can be any information available to the workforce management system, and can be passed in any of a number of ways well established in the art. In an embodiment of the invention, the information is passed from the Adherence Module 109 or other components of the WFM system to the agent scripting engine 201 via data that is "attached" to the call, or added to the predefined interaction information maintained by the interaction management engine 110. This is a common method in the art of passing contextual data concerning an ongoing interaction from one part of an interaction management system to another, in this case from routing to WFM. In another embodiment, data is passed directly from the Adherence Module 109 or other components of the WFM system to the agent scripting engine 201 in the form of an XML data tree, another method well established in the art. In yet another embodiment, information can be passed from the Adherence Module 109 or other components of the WFM system to the agent scripting engine 201 by insertion into a database table which is periodically read by the recipient components.

In an embodiment of the present invention, the WFM data 400 is adjusted forecast 103 data for the next forecasting increment (typically, but not always, 15 minutes). Most WFM systems in the art continually update the forecast 103 during the day to reflect deviations from the initial forecast 103 that have occurred. While most agent scripting engines 201 have access to real time statistical information concerning contact center operations, this data is necessarily retrospective. Having access to the adherence module's 109 adjustments to the forecast 103 of the next time increment makes it possible for agent scripts to proactively react to impending problems before they hit. For instance, if the adherence monitor 109 informs the agent scripting engine 201 that the noon time segment is likely to have traffic at 125% of forecast 103, and service levels are predicted to fall very far below the standard set for the contact center as a result, then the agent scripting engine 201 can begin to send fewer unnecessary prompts to agents in an effort to immediately lower AHT (for example, cross-sell and up-sell prompts and satisfaction surveys could be eliminated proactively). Alternatively, the forecasting engine 102 can send the agent scripting engine 201 periodic target AHT values. Since the scripting engine 201 controls what is presented to the agent on the agent desktop 202 it has the ability to dynamically adjust the amount of material presented in order to meet the target AHT. It can be seen that this approach will make the AHT portion of the forecast 103 a self-fulfilling prophecy, and of course the amount of scheduling error in the schedule 108 will be significantly reduced. Furthermore, the adherence engine 109 can detect deviations in call volume from the forecast 103 and automatically adjust the target AHT and send it to the scripting engine 201 so that the desired service levels can be maintained with the current scheduled staffing. Additionally, when staffing deviations from the schedule 108 occur, the adherence module 109 can similarly modify the target AHT and notify the scripting engine 201 of its new target. Since the cost of either overstaffing or understaffing in a contact center can be very significant, it can be seen that the existence of feedback mechanisms between the workforce management system and the agent scripting system according to the present invention will have a significant beneficial impact on contact center operations with little difficulty.

What is claimed is:

1. A system for integrating agent scripting and workforce management functions in contact centers, comprising:
   a workforce management system consisting of at least a forecasting engine, a business rules module, a scheduling engine, and an adherence module;
   an agent scripting engine; and
   a feedback mechanism between the said agent scripting engine and either the said forecasting engine or the said adherence module of the said workforce management system, or both;
   wherein useful information is exchanged dynamically between the said workforce management system and the said agent scripting engine, said information exchange being unidirectional in either direction, or bidirectional.

2. A method for integrating agent scripting and workforce management functions in contact centers, the method comprising of the steps of:
   providing a software-based feedback mechanism between the agent scripting engine and the workforce management system, wherein the scripting engine at least provides information affecting average handling time (AHT) of calls;
   using the said feedback mechanism to pass useful information from the workforce management system dynamically to the agent scripting engine; and
   modifying the behavior of the said agent scripting engine to take advantage of the information thus provided from the said workforce management system, the information provided from the said workforce management system based partially on the feedback information from the scripting engine.

3. A method for integrating agent scripting and workforce management functions in contact centers, the method comprising of the steps of:
   providing a software-based feedback mechanism between the agent scripting engine and the workforce management system;
   using the said feedback mechanism to pass useful information regarding at least call handling statistics from the agent scripting engine dynamically to the workforce management system; and
   modifying the behavior of the said workforce management system to take advantage of the information thus provided from the said agent scripting engine.

* * * * *